United States Patent
Tesar

(10) Patent No.: US 10,422,387 B2
(45) Date of Patent: Sep. 24, 2019

(54) QUICK CHANGE INTERFACE FOR LOW COMPLEXITY ROTARY ACTUATOR

(71) Applicant: Delbert Tesar, Austin, TX (US)

(72) Inventor: Delbert Tesar, Austin, TX (US)

( * ) Notice: Subject to any disclaimer, the term of this patent is extended or adjusted under 35 U.S.C. 154(b) by 744 days.

(21) Appl. No.: 14/715,228

(22) Filed: May 18, 2015

(65) Prior Publication Data

US 2015/0330455 A1 Nov. 19, 2015

Related U.S. Application Data

(60) Provisional application No. 61/994,360, filed on May 16, 2014.

(51) Int. Cl.
*F16D 1/116* (2006.01)
*F16D 7/04* (2006.01)

(52) U.S. Cl.
CPC .............. *F16D 1/116* (2013.01); *F16D 7/044* (2013.01); *Y10T 403/32975* (2015.01)

(58) Field of Classification Search
CPC .. B25J 9/08; F16D 1/108; F16D 1/112; F16D 3/56; F16D 3/58; F16D 3/70; Y10S 464/901; Y10T 74/20323; Y10T 74/20335; Y10T 403/32975; Y10T 403/559
USPC .... 464/81, 85, 149, 157, 182, 901; 403/164, 403/298, DIG. 4; 74/490.03, 490.05
See application file for complete search history.

(56) References Cited

U.S. PATENT DOCUMENTS

| | | | |
|---|---|---|---|
| 276,776 A | 5/1883 | Clemons | |
| 341,389 A | 5/1886 | Prescott | |
| 386,168 A | 7/1888 | Spencer et al. | |
| 1,204,925 A * | 11/1916 | Aldrich | F16D 3/70 403/337 |
| 1,601,750 A | 10/1926 | Wildhaber | |
| 2,084,844 A | 6/1937 | Harris | |
| 2,343,839 A * | 3/1944 | Austin | F16D 3/68 464/149 |
| 2,750,850 A | 6/1956 | Wildhaber | |
| 3,310,990 A | 3/1967 | Zettel | |

(Continued)

FOREIGN PATENT DOCUMENTS

| | | |
|---|---|---|
| EP | 0058025 A1 | 8/1982 |
| EP | 0527483 A2 | 2/1993 |

(Continued)

OTHER PUBLICATIONS

"How Gears Work." HowStuffWorks. Nice, Karim. Jul. 5, 2013, [online], [retrieved on Mar. 1, 2017] Retrieved from the Internet <URL: https://web.archive.org/web/20130507095052/https://science.howstuffworks.com/transport/engines-equipment/gear.htm>.*

(Continued)

*Primary Examiner* — Josh Skroupa
(74) *Attorney, Agent, or Firm* — John A. Fortkort; Fortkort & Houston PC

(57) ABSTRACT

A rotary actuator includes a first interface surface with a plurality of apertures defined therein; a plurality of interface modules, wherein each interface module includes a first portion which releasably engages one of said apertures, and a second portion which protrudes from said first interface surface; a second interface surface which releasably mates with said first interface surface; and a gear train which rotates said first interface surface about an axis.

14 Claims, 17 Drawing Sheets

(56) References Cited

U.S. PATENT DOCUMENTS

| | | | |
|---|---|---|---|
| 3,371,552 A | 3/1968 | Soper | |
| 3,454,394 A | 7/1969 | Honobe | |
| 3,638,454 A * | 2/1972 | Croset | F16D 3/68 |
| | | | 464/149 |
| 3,705,522 A | 12/1972 | Ogawa | |
| 3,709,055 A | 1/1973 | Grove | |
| 3,729,276 A | 4/1973 | Boyadjieff et al. | |
| 3,837,179 A * | 9/1974 | Barth | F16D 3/68 |
| | | | 464/182 |
| 3,907,470 A | 9/1975 | Harle et al. | |
| 4,095,150 A | 6/1978 | Senckel | |
| 4,270,401 A | 6/1981 | Davidson | |
| 4,367,424 A | 1/1983 | Presley | |
| 4,407,170 A | 10/1983 | Fukui | |
| 4,505,166 A | 3/1985 | Tesar | |
| 4,768,400 A | 9/1988 | McKay | |
| 4,846,018 A | 7/1989 | Matsumoto et al. | |
| 4,922,781 A | 5/1990 | Peiji | |
| 4,988,581 A | 1/1991 | Wycliffe | |
| 5,102,377 A | 4/1992 | Spanski | |
| 5,116,291 A | 5/1992 | Toyosumi et al. | |
| 5,293,107 A | 3/1994 | Akeel | |
| 5,355,743 A | 10/1994 | Tesar | |
| 5,692,989 A | 12/1997 | Kamlukin | |
| 5,704,864 A | 1/1998 | Yanagisawa | |
| 6,119,542 A | 9/2000 | Arbrink | |
| 6,367,571 B1 | 4/2002 | Schwarz | |
| 6,672,966 B2 | 1/2004 | Muju et al. | |
| 6,791,215 B2 | 9/2004 | Tesar | |
| 6,948,402 B1 | 9/2005 | Amendolea | |
| 6,991,580 B2 | 1/2006 | Elser et al. | |
| 7,081,062 B2 | 7/2006 | Tesar | |
| 7,122,926 B2 | 10/2006 | Tesar | |
| 7,201,700 B2 | 4/2007 | Buxton | |
| 7,431,676 B2 | 10/2008 | Tesar | |
| 7,462,105 B2 * | 12/2008 | Lattin | F16D 3/70 |
| | | | 464/137 |
| 7,534,184 B2 | 5/2009 | Tsurumi | |
| 7,552,664 B2 | 6/2009 | Bulatowicz | |
| 7,553,249 B2 | 6/2009 | Nohara | |
| 7,604,599 B2 | 10/2009 | Fujimoto et al. | |
| 7,641,579 B2 | 1/2010 | Junkers | |
| 7,722,494 B2 | 5/2010 | Tesar | |
| 7,766,634 B2 | 8/2010 | Liavas et al. | |
| 7,811,193 B2 | 10/2010 | Nakamura | |
| 7,935,017 B2 | 5/2011 | Kurita et al. | |
| 7,942,779 B2 | 5/2011 | Kobayashi | |
| 7,976,420 B2 | 7/2011 | Nakamura | |
| 7,988,581 B2 | 8/2011 | Kobayashi | |
| 8,022,564 B2 | 9/2011 | Nohara et al. | |
| 8,029,400 B2 | 10/2011 | Nakamura | |
| 8,033,942 B2 | 10/2011 | Tesar | |
| 8,047,943 B2 | 11/2011 | Nakamura | |
| 8,117,945 B2 | 2/2012 | Nakamura | |
| 8,162,789 B2 | 4/2012 | Takeuchi | |
| 8,235,856 B2 | 8/2012 | Nakamura | |
| 8,308,599 B2 | 11/2012 | Akami | |
| 8,323,140 B2 | 12/2012 | Nakamura | |
| 8,353,798 B2 | 1/2013 | Miyoshi et al. | |
| 8,382,629 B2 | 2/2013 | Hirata | |
| 8,435,149 B2 | 5/2013 | Koyama et al. | |
| 8,523,732 B2 | 9/2013 | Le Moal | |
| 8,545,357 B2 | 10/2013 | Hibino | |
| 9,676,104 B2 * | 6/2017 | Sutton, Jr. | F16D 3/56 |
| 2003/0027681 A1 | 2/2003 | Kakemo | |
| 2004/0007923 A1 | 1/2004 | Tesar | |
| 2004/0102274 A1 | 5/2004 | Tesar | |
| 2004/0103742 A1 | 6/2004 | Tesar | |
| 2005/0168084 A1 | 8/2005 | Tesar | |
| 2005/0221945 A1 | 10/2005 | Plath | |
| 2006/0264292 A1 | 11/2006 | Plath | |
| 2007/0168081 A1 | 7/2007 | Shin et al. | |
| 2007/0249457 A1 | 10/2007 | Tesar | |
| 2008/0060473 A1 | 3/2008 | Li | |
| 2008/0139357 A1 | 6/2008 | Fujimoto | |
| 2008/0257088 A1 | 10/2008 | Tesar | |
| 2008/0269922 A1 | 10/2008 | Tesar | |
| 2008/0295623 A1 | 12/2008 | Kurita et al. | |
| 2009/0075771 A1 | 3/2009 | Tesar | |
| 2009/0118050 A1 | 5/2009 | Takeuchi | |
| 2010/0113206 A1 | 5/2010 | Wang et al. | |
| 2012/0088622 A1 | 4/2012 | Tesar | |
| 2012/0204671 A1 | 8/2012 | Tesar | |
| 2012/0215450 A1 | 8/2012 | Ashok et al. | |
| 2013/0217530 A1 | 8/2013 | Tesar | |
| 2014/0224064 A1 | 8/2014 | Tesar | |
| 2014/0228162 A1 | 8/2014 | Tesar | |
| 2014/0246893 A1 | 9/2014 | Tesar | |

FOREIGN PATENT DOCUMENTS

| | | |
|---|---|---|
| EP | 2149724 A1 | 2/2010 |
| EP | 2169263 B1 | 3/2010 |
| GB | 008203 | 4/1903 |
| GB | 224449 | 11/1924 |
| GB | 419171 | 11/1934 |
| GB | 426136 | 3/1935 |
| GB | 450246 | 7/1936 |
| GB | 676894 | 8/1952 |
| GB | 759185 | 10/1956 |
| GB | 775629 | 5/1957 |
| GB | 856486 | 12/1960 |
| GB | 926760 | 5/1963 |
| GB | 1083689 | 9/1967 |
| GB | 1104250 | 2/1968 |
| GB | 1176936 | 1/1970 |
| GB | 1179105 | 1/1970 |
| GB | 1378909 | 3/1972 |
| GB | 1409651 | 10/1975 |
| GB | 1453135 | 10/1976 |
| GB | 1453135 A | 10/1976 |
| GB | 1494895 | 12/1977 |
| GB | 2014260 A | 8/1979 |
| GB | 2377740 A | 1/2003 |
| GB | 2387882 A | 10/2003 |
| GB | 2489503 A | 10/2012 |
| WO | 96/04493 A1 | 2/1996 |

OTHER PUBLICATIONS

Ghionea, Adrian et al.; "Utilization of Some Computer Assisted Techniques in Generating and Study of the Hypocycloidal Flanks of the Spur Gear Teeth Stress"; 5th International Meeting of the Carpathian Region Specialists in the Field of Gears; May 2004; 8 pages.

Jones, Chris M. Sr.; "'Real-Time' Travel: A Strategy for Distributed Synchronized Actuator Control Using Open Standards"; Naval Engineers White Paper; 9 pages.

Rabindran, Dinesh et al.; "A Differential-Based Dual Actuator for a Safe Robot Joint: Theory and Experiments"; World Automated Congress (WAC); Aug. 2014; 6 pages.

Tesar, Delbert et al.; "Test-Bed to Measure the Performance Criteria of Actuators"; Robotics Research Group, University of Texas at Austin, 2002 Deliverable for Thread 3: High Performance Envelope Based on Intelligent; Dec. 1, 2001; 14 pages.

Townsend, Dennis P.; "A Comparison of the Double-Circular-Arc-Gear Drives With Standard Involute Gear Drives"; Abstract; www.pumpjack.com/downloads; 8 pages.

Litvin, Faydor L. et al.; "Helical Gears With Circular Arc Teeth: Generation, Geometry, Precision and Adjustment to Errors, Computer Aided Simulation of Conditions of Meshing, and Bearing Contact"; NASA Contractor Report 4089; AVSCOM Technical Report 87-C-18; Oct. 1987; 95 pages.

Krishnamoorthy, Ganesh et al.; "Multi-Sensor Architecture for Intelligent Electromechanical Actuators"; 12th IFToMM World Congress, Besancon, France; Jun. 18-21, 2007; 6 pages.

Lim, Gee Kwang et al.; "Modeling and Simulation of a Stewart Platform Type Parallel Structure Robot"; Final Report, Grant No. NAG 9-188; The University of Texas at Austin, Mechanical Engineering Department; Apr. 1989; 216 pages.

(56) References Cited

OTHER PUBLICATIONS

Lee, Hoon et al.; "An Analytical Stiffness Analysis Between Actuator Structure and Principal Bearings Used for Robot Actuators"; Proceedings of ASME 2011 International Design Engineering Technical Conference and Computers and Information in Engineering Conference; IDEC/CIE 2011; Aug. 29-31, 2011; Washington, D.C.; 10 pages.

Koran, Lucas et al.; "Duty Cycle Analysis to Drive Intelligent Actuator Development'"; IEEE Systems Journal; May 2008; 14 pages.

Ashok, Pradeepkumar et al.; "Guidelines for Managing Sensors in Cyber Physical Systems with Multiple Sensors"; Research Article; Hindawi Publishing Corporation, Journal of Sensors; vol. 2011, Article ID 321709; Nov. 22, 2011; 16 pages.

Hvass, Paul Brian et al.; "Condition Based Maintenance for Intelligent Electromechanical Actuators"; Research Paper; Jun. 2004; 262 pages.

Kang, Seong-Ho et al.; "Indoor GPS Metrology System with 3D Probe for Precision Applications"; ASPE.pointinspace.com/publications/annual_2004 Papers; 2004; 4 pages.

Knight, W.; "The Robots Running This Way"; MIT Technology Review; 2014; 8 pages.

Ting, Yung et al.; "A Control Structure for Fault-Tolerant Operation of Robotic Manipulators"; Research Paper; University of Texas at Austin, Department of Mechanical Engineering; Apr. 1993; 10 pages.

* cited by examiner

-- PRIOR ART --

-- PRIOR ART --

-- PRIOR ART --

-- PRIOR ART --

-- PRIOR ART --

US 10,422,387 B2

QUICK CHANGE INTERFACE FOR LOW COMPLEXITY ROTARY ACTUATOR

CROSS-REFERENCE TO RELATED APPLICATION

This application claims the benefit of priority from U.S. Provisional Application No. 61/994,360, filed May 16, 2014, having the same inventor and the same title, and which is incorporated herein by reference in its entirety.

FIELD OF THE DISCLOSURE

The present disclosure relates generally to rotary actuators, and more specifically to a quick change interface for a rotary actuator.

BACKGROUND OF THE DISCLOSURE

Electromechanical actuators (EMAs) play a key role in the performance and cost effectiveness of intelligent electromechanical systems. This role is underscored by the growing market for EMAs. Indeed, significant parallels exist between the market development currently unfolding for EMAs and the market development of semiconductor chips seen in the electronics industry over the past several decades. At present, it is forecasted that EMAs will see a continued growth of 50% every three years, and that the market for EMAs will exceed the market for semiconductor chips in two decades.

In order for EMAs to realize their full commercial potential, it is important for the cost structure of these devices to be reduced. This, in turn, requires that EMAs become more modularized, so that a relatively small set of EMAs may be developed which span a wide range of applications. By contrast, much of the development in EMAs to date has occurred via an ad hoc approach, in which EMAs are developed for a particular end use and are unsuitable for a broader range of applications.

The realization of a modularized set of EMAs requires the further development of quick-change interfaces to allow the actuators to be quickly adapted or repurposed to work with different tools and systems. Several interfaces have been developed in the art to date. The interfaces depicted in FIGS. 1-10 (not all of which are quick-change interfaces) are representative, and include the Nema flanged interface 101, the Nema bolt circle interface 103, the kinematic coupling interface 201, the Curvic rigid coupling interface 301, and the Tesar-Shin precision coupling interface 401.

SUMMARY OF THE DISCLOSURE

In one aspect, a rotary actuator is provided which comprises a first interface surface with a plurality of apertures defined therein; a plurality of interface modules, wherein each interface module includes a first portion which releasably engages one of said apertures, and a second portion which protrudes from said first interface surface; a second interface surface which releasably mates with said first interface surface; and a gear train which rotates said first interface surface about an axis.

DETAILED DESCRIPTION

Figure 1:
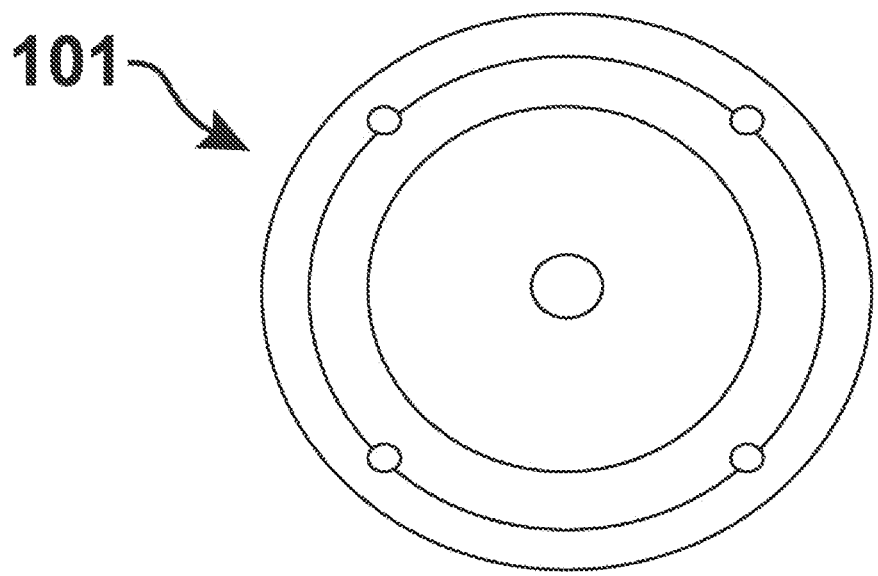
FIGS. 1-2 are illustrations of prior art actuator interfaces.
Figure 2:
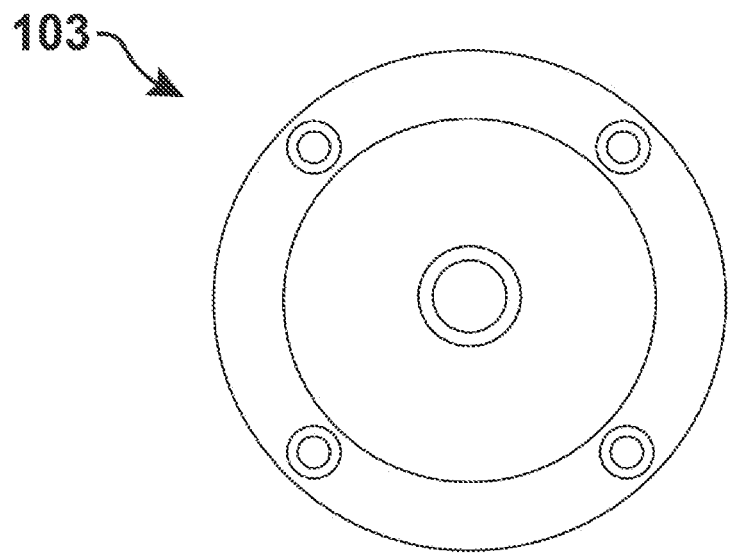

Many of the actuator interfaces developed to date have limitations that preclude them from serving as quick-change interfaces for a modularized set of EMAs. For example, although the NEMA bolt 101 and bolt/flange 103 interfaces (see FIGS. 1-2) are low cost interfaces, these devices utilize 4-8 bolts to achieve a coupling, and hence are not considered quick-change interfaces.

Moreover, the NEMA interfaces 101, 103 provide relatively poor accuracy. Here, the term "accuracy" is used to specify the degree of repeatable assembly the interface offers, and hence indicates the degree of positional variation that occurs when the interface is disassembled and reassembled. Interfaces exhibiting poor accuracy are undesirable because their use requires metrology and calibration to ensure positional accuracy, thus precluding their use as quick-change interfaces in applications where positional accuracy is important. For sake of completeness, it is to be noted that, although the Nema flanged interface 103 is equipped with a flange that provides improved radial stiffness compared to the Nema bolt interface 101, this modification provides only a modest improvement in accuracy.

Figure 3:
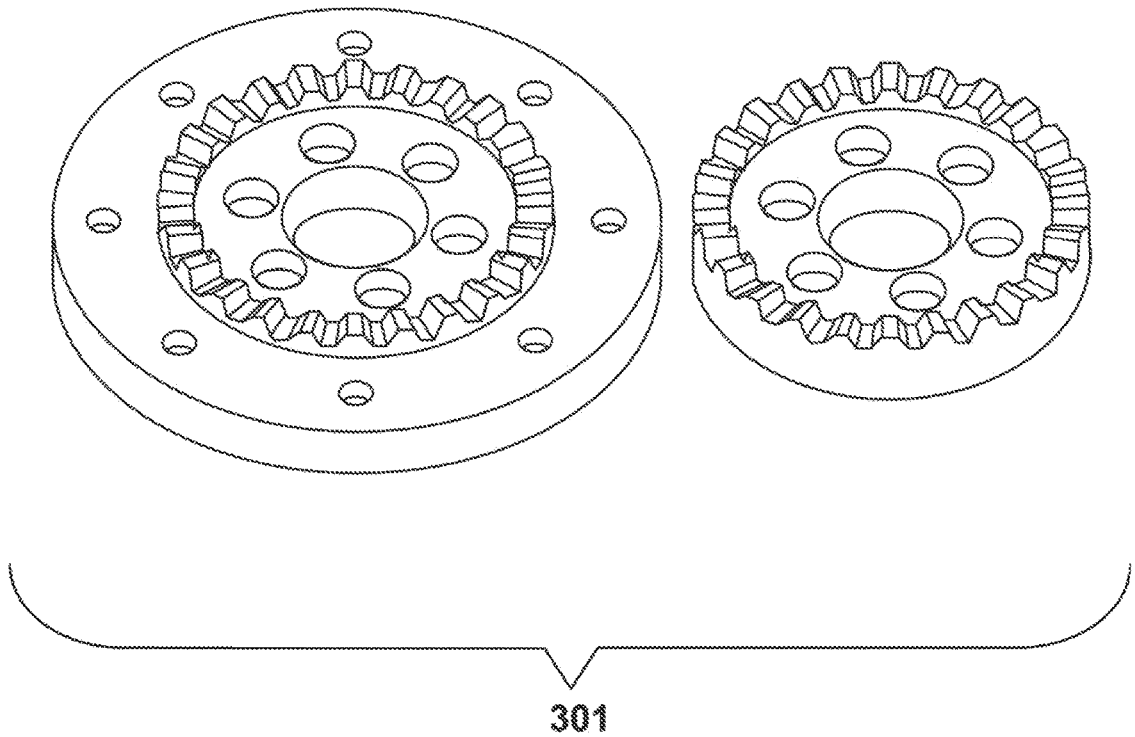
FIG. 3 is an illustration of a Curvic rigid coupling interface.
Figure 4:
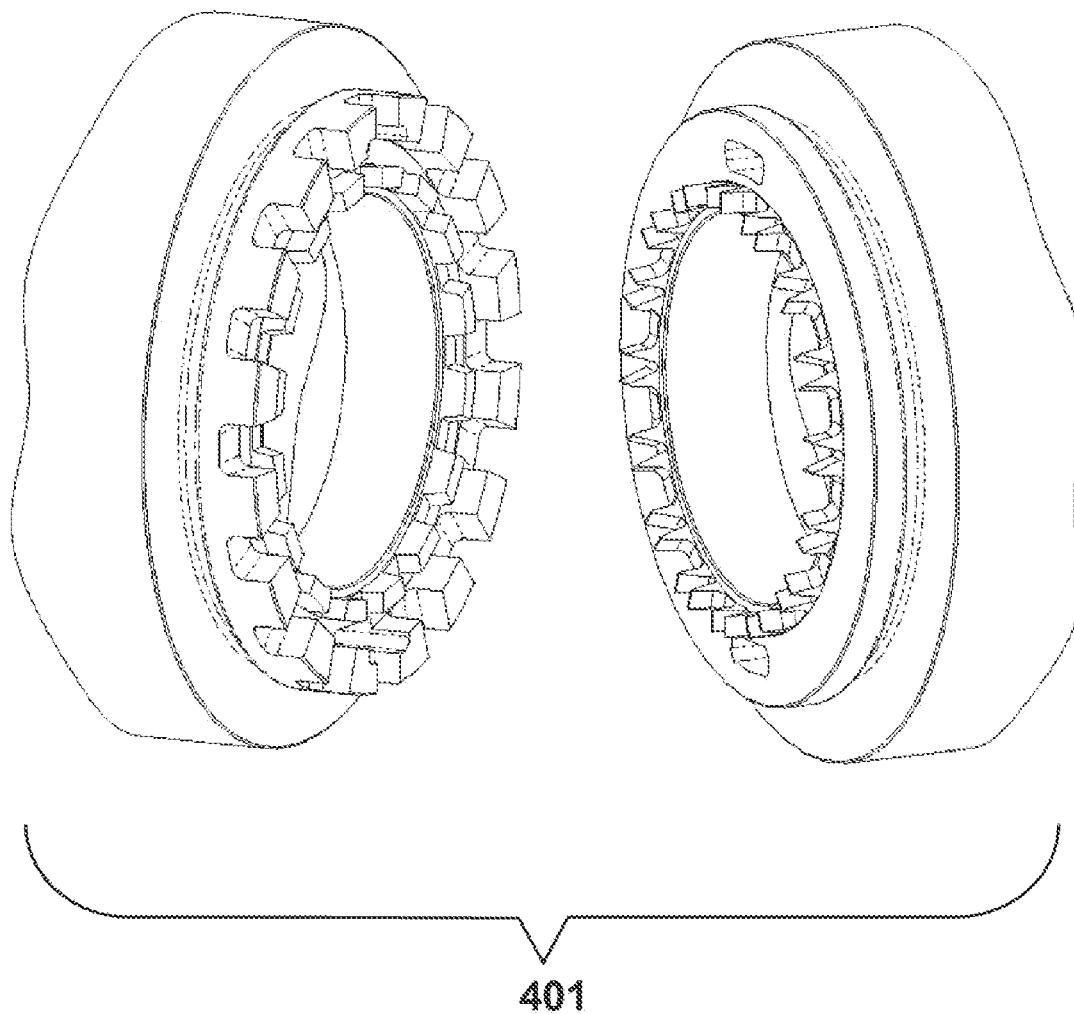
FIG. 4 is an illustration of a Tesar-Shin precision coupling interface.
Figure 5:
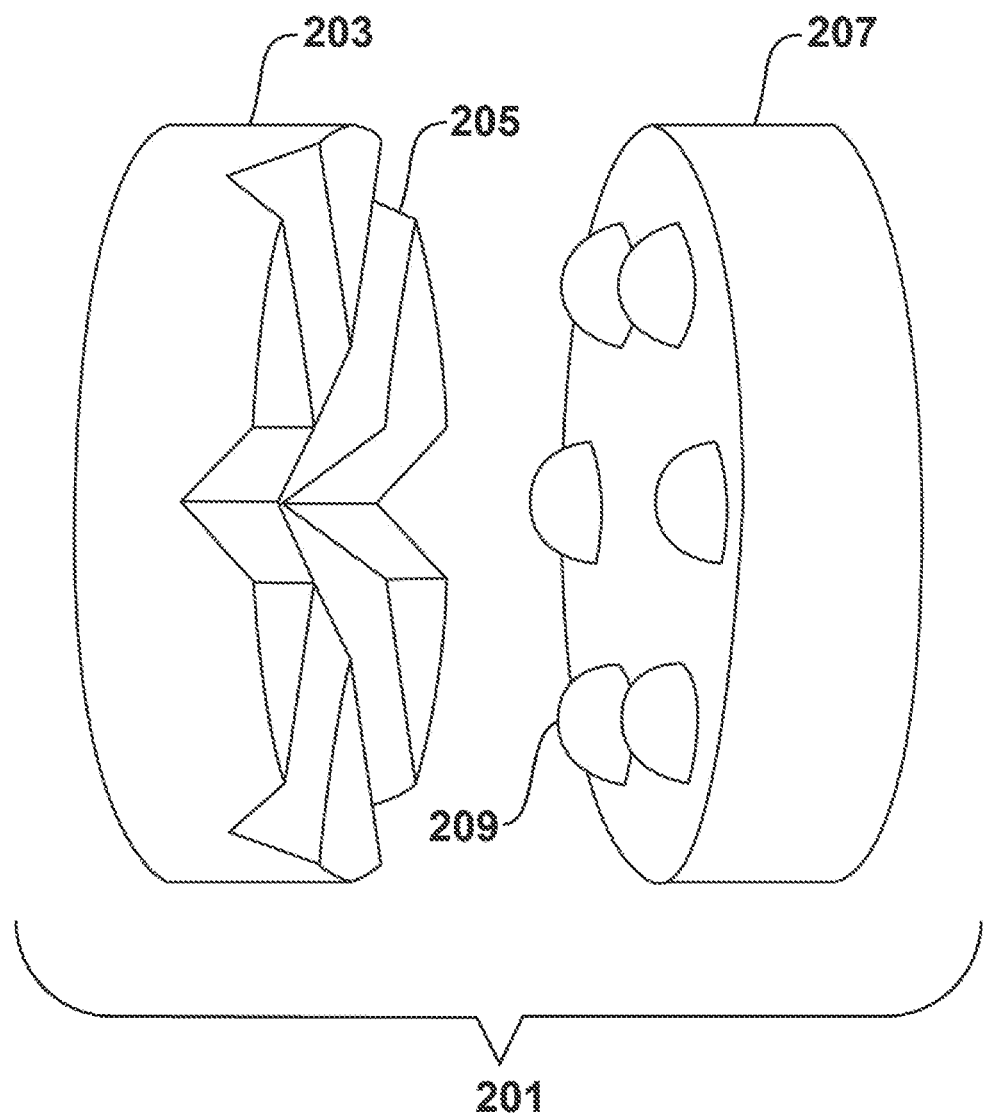
FIG. 5 is an illustration of a kinematic coupling interface.

The kinematic coupling interface 201 is shown in greater detail in FIG. 5. As seen therein, this interface utilizes a first member 203 equipped with a series of grooves 205 and a second member 207 equipped with a series of balls 209. In use, the ball 209 and groove 205 pairs engage to provide Hertzian contacts. The kinematic coupling interface 201 provides good accuracy in the axial direction. However, it exhibits low stiffness and low load capacity, and is overly compliant (that is, it lacks suitable stiffness) in virtually all directions. For this reason, in applications requiring accuracy and stiffness, the Curvic 301 (see FIG. 3) and Tesar/Shin 401 (see FIG. 4) interfaces are typically the interfaces of choice.

Figure 6:
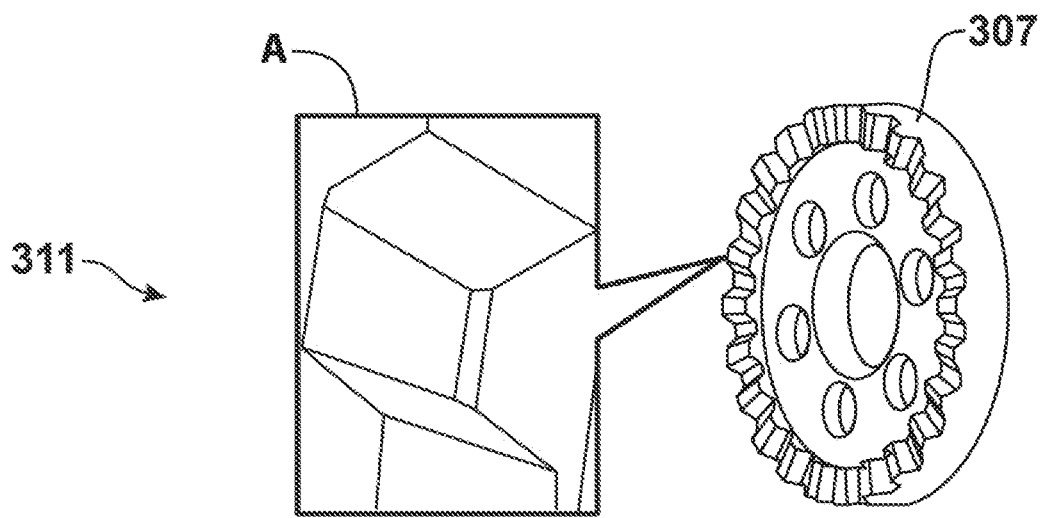
FIGS. 6-7 are illustrations (with magnified views of REGIONS A and B thereof) of the coupling elements of a Curvic rigid coupling interface.
Figure 7:
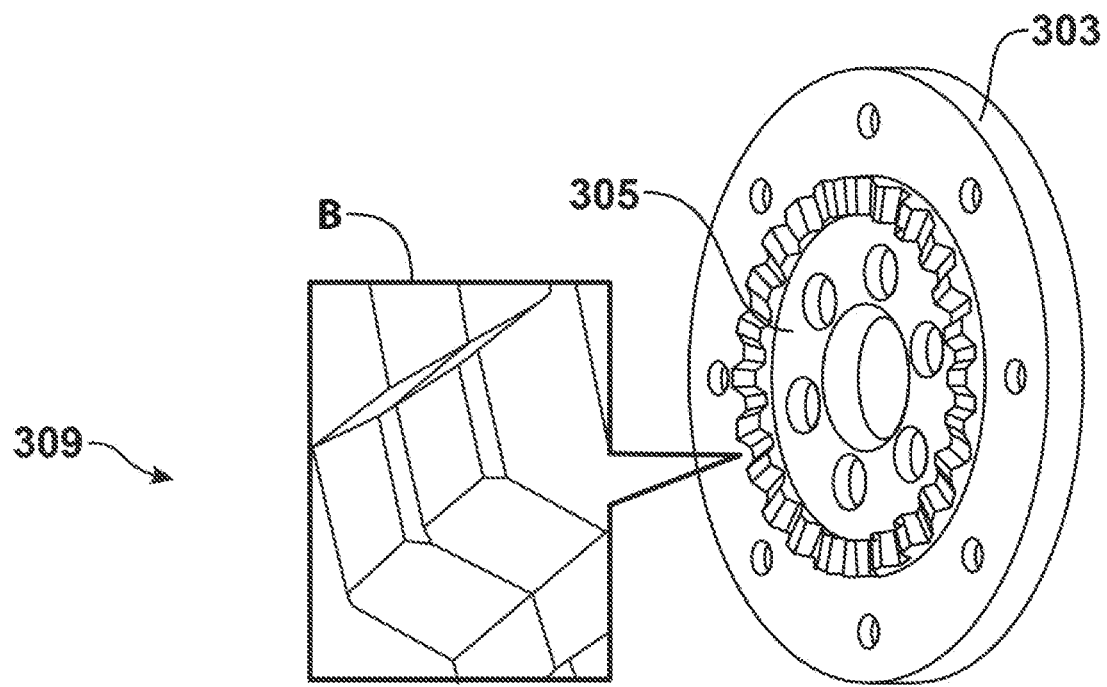

As seen in FIGS. 6-7, the Curvic rigid coupling interface 301 utilizes a pair of meshing faced toroidal gears in the form of a rotary disc 303 (disposed within a stationary disc 305) and a releasing disc 307 to provide a very rigid, rugged and accurate repeatable interface. The Curvic interface 301 utilizes pairs of concave 309 and convex 311 teeth to achieve contact, which ensures proper alignment when the stationary disc 305 and releasing disc 307 are pressed together. Further, because of the mating of the concave 309 and convex 311 teeth, the distance from coupling centerline to the OD of the coupling will always be the same, as will be the face of whatever the coupling is affixed to. However, despite its many advantages, the Curvic coupling requires a high closing force generated by bolts in a heavy structure, and thus is not considered a quick-change interface.

Figure 8:
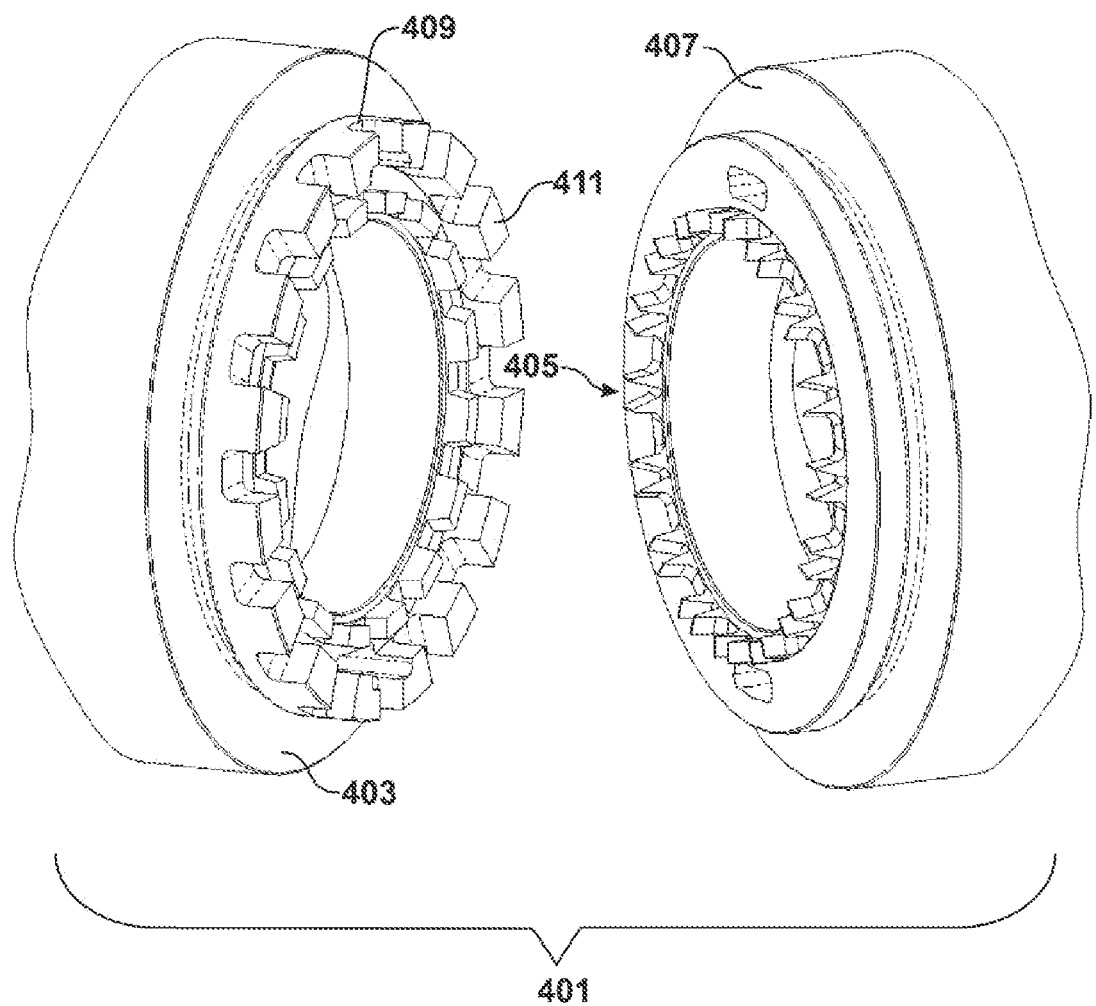
FIG. 8 is an illustration of a Tesar-Shin precision coupling interface.
Figure 9:
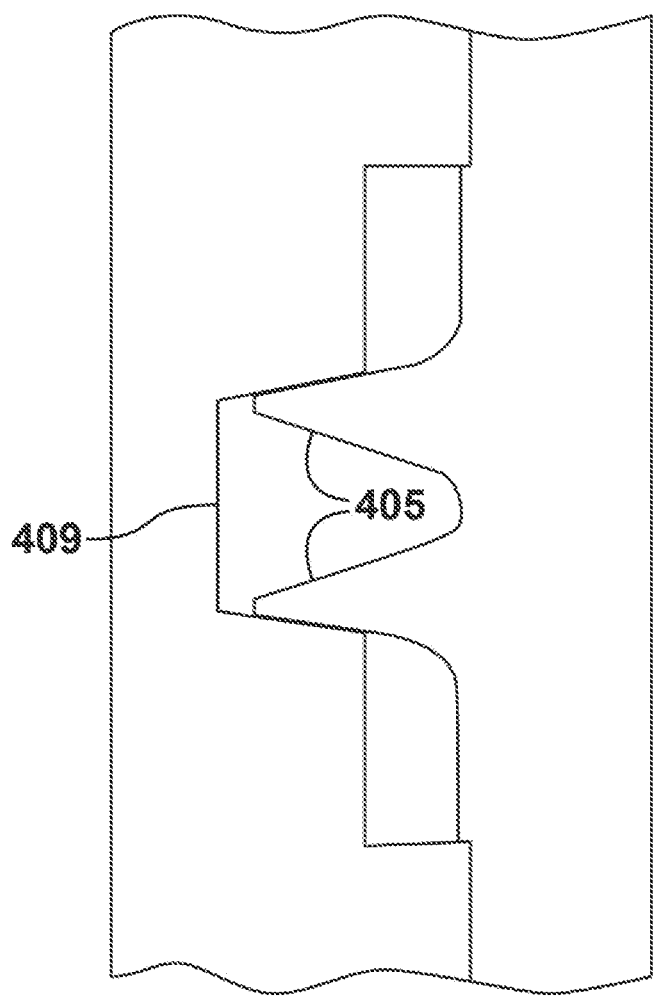
FIG. 9 is a close-up illustration of the mating elements of the Tesar-Shin precision coupling interface of FIG. 3.
Figure 10:
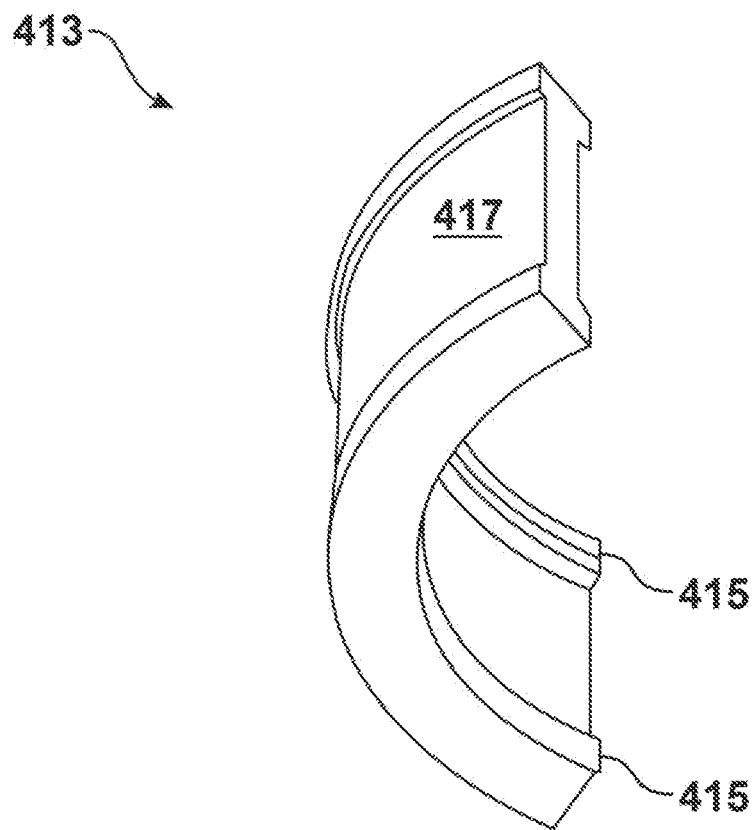
FIG. 10 is an illustration of a portion of a C-clamp used with the Tesar-Shin precision coupling interface of FIG. 3.

The Tesar-Shin precision coupling interface 401, which is depicted in FIGS. 8-10, comprises a first 403 mating member equipped with a series of split wedges 405, and a second 407 mating member equipped with wedge mating surfaces 409 and a ring of contact flats 411. In a typical embodiment, the interface 401 utilizes 16 flexible tooth pairs (the split wedges 405 and wedge mating surfaces 409), the ring of contact flats 411 and a quick-change split C-clamp 413 (see FIG. 10) to achieve contact.

The Tesar-Shin interface 401 interface provides high accuracy, good stiffness, and low weight. The mating surfaces in this interface 401 are contained in repeating modules (4 up to 16), all of which may be machined on standard tools. Moreover, the precision assembly of split wedges 405 represents a deformable (compliant) structure which dramatically improves closing accuracy. This result is achieved with an in-depth body of analytics which controls the relative influence of forces, deformations, and tolerances. Once it has achieved accurate closure, the contact flats 411 provide for the necessary out-of-plane stiffness. Also, the split C-clamp 413 (FIG. 10), which uses tapered wedges 415 to generate the closing force, is designed to accommodate a standard commercial tightening band in its outside flat cylindrical groove 417.

As noted above, the Tesar-Shin interface 401 possesses many advantages in comparison to other known rotary actuator interfaces. However, despite its many advantages, a need exists in the art to produce an interface that is less expensive to produce and more modular in design than the existing Tesar-Shin interface 401.

It has now been found that the foregoing needs may be met the through the provision of a quick-change interface for a rotary actuator that comprises first and second mating members, each of which is equipped with a series of modules that engage one of a plurality of apertures in the member, preferably in a press-fit manner. Each of the modules contains a plurality of mating features, such that the mating features on the first member releasably engage the mating features on the second member.

Figure 11:
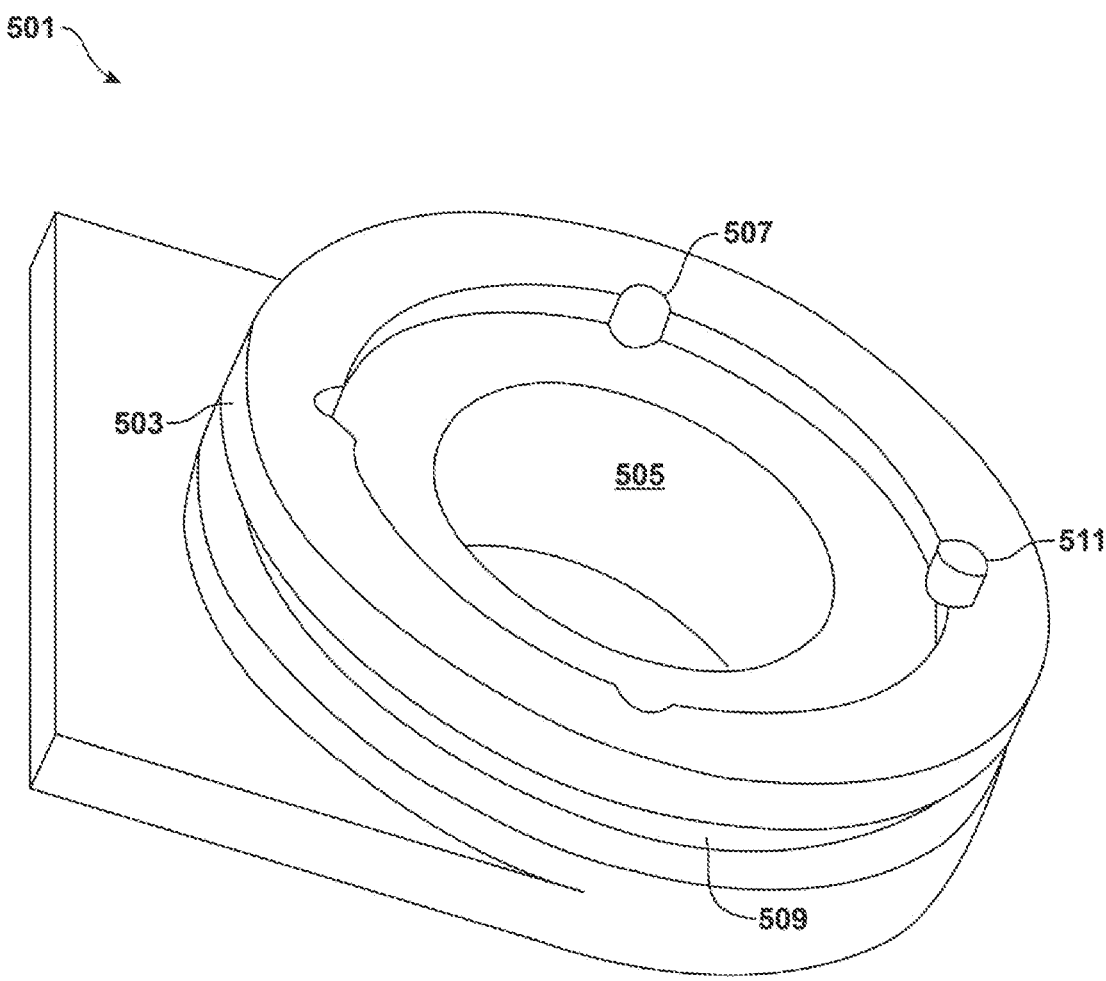
FIG. 11 is an illustration of a particular, non-limiting embodiment of an interface for a rotary actuator in accordance with the teachings herein.
Figure 12A:
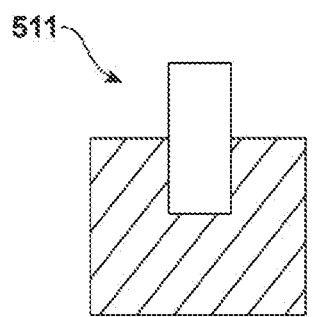
FIGS. 12a, 12b and 12c are illustrations of various pins that may be utilized in an embodiment of a variation of the Tesar-Shin precision coupling interface made in accordance with the teachings herein.
Figure 12B:
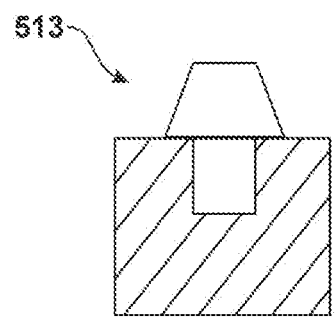
Figure 12C:
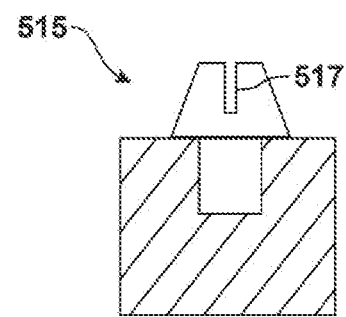

FIG. 11 illustrates a first particular, non-limiting embodiment of an interface for a rotary actuator in accordance with the teachings herein. As seen therein, the interface 501 comprises a first annular member 503 which has a centering ring 505 thereon which is equipped with a plurality of apertures 507. The annular member 503 is equipped with an annular groove 509 which may be utilized to secure the first annular member 503 to a second annular member (not shown) by way of a split clamp (e.g., of the type depicted in FIG. 10) or other suitable device. The interface 501 is further equipped with one or more precision cylindrical pins 511 which engage the apertures 507 in the first annular member 503, and which provide pre-assembly alignment before large closing forces are applied (by, for example, bolts, screws or other suitable fasteners).

While the use of the cylindrical pins 511 enhances radial accuracy and thus augments the accuracy provided by the centering ring 505, it does little to assist in out-of-plane accuracy or rotary stiffness. Some improvement in centering accuracy may be obtained through the use of a 7° tapered pin 513. In applications where it is desirable to make the tapered pin deformable, a slotted tapered pin 515 may be provided, which differs from the tapered pin 513 in that it is equipped with two perpendicular slots 517.

When a tapered pin is utilized, the hole taper is typically within the range of 5° to 10°, preferably within the range of 6° to 9°, more preferably within the range of 7° to 8°, and most preferably about 7.5°, while the pin is preferably tapered at about 0.5° less than the hole taper. The top width of the pin is typically about 0.05" to about 0.002" less than the hole width, and preferably 0.001" less than the hole width ($d_2$–0.001"). The bottom of the taper is preferably slightly larger in diameter than the mating hole, more preferably has a diameter within the range of about 0.0001" to about 0.0003", and most preferably has a diameter of about 0.0002" ($d_1$–0.0002") to improve closing accuracy.

Figure 13:
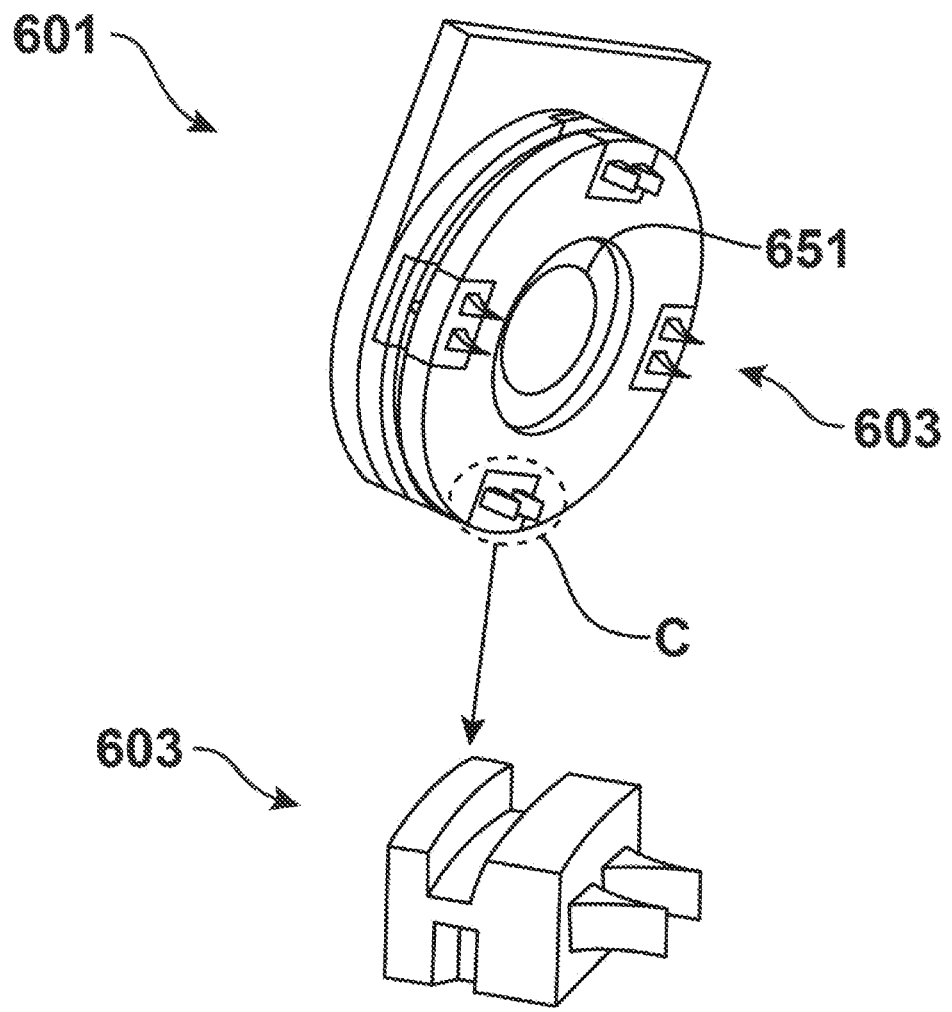
FIG. 13 is an illustration of a particular, non-limiting embodiment of a rotary actuator in accordance with the teachings herein which is equipped with deformable wedge modules; a magnified view of a deformable wedge module from REGION C thereof is also depicted.
Figure 14:
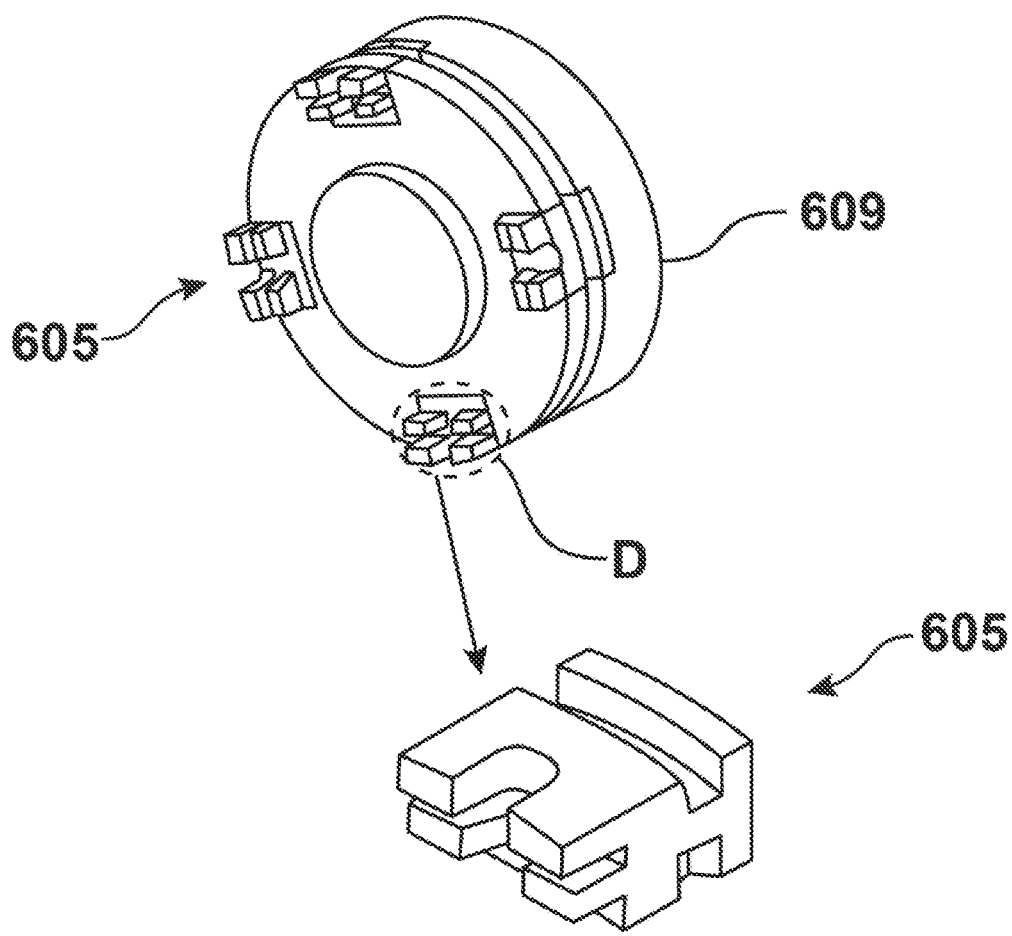
FIG. 14 is an illustration of a particular, non-limiting embodiment of a rotary actuator in accordance with the teachings herein which is equipped with rigid wedge modules; a magnified view of a rigid wedge module from REGION D thereof is also depicted.
Figure 15:
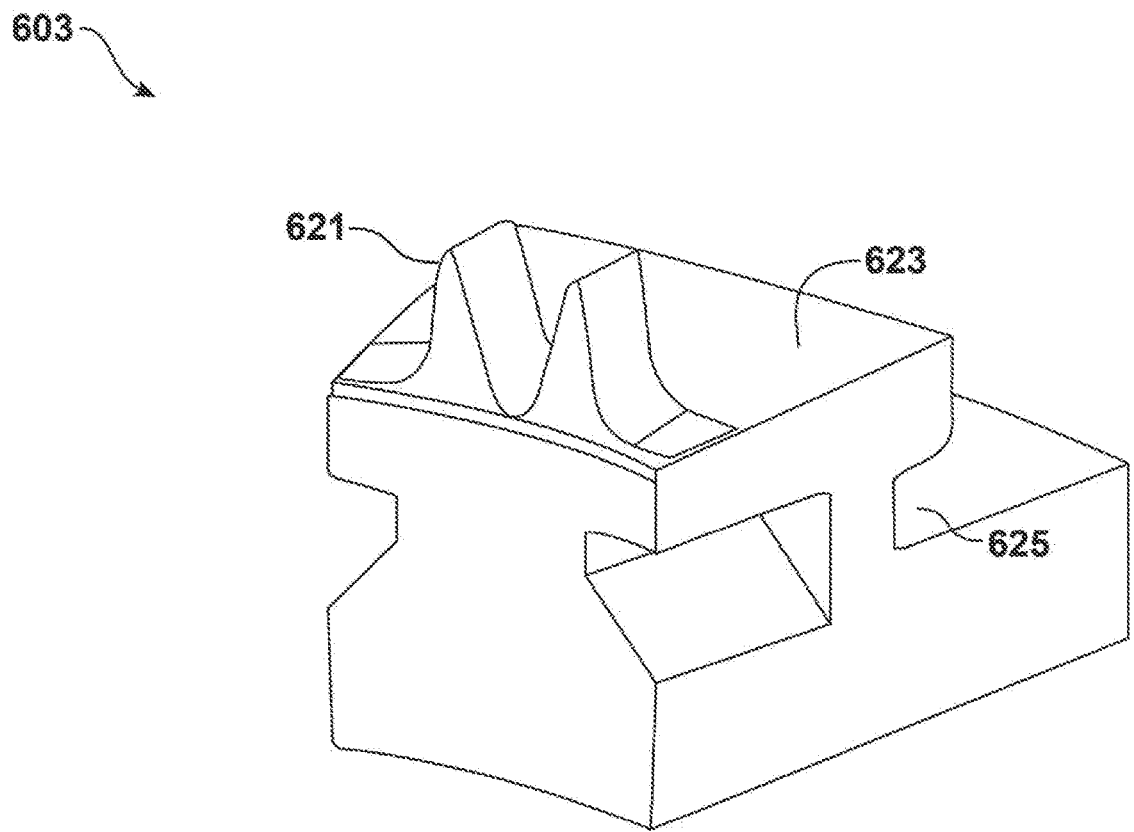
FIG. 15 is an illustration of a deformable wedge module which may be utilized in an embodiment of a variation of the Tesar-Shin precision coupling interface made in accordance with the teachings herein.
Figure 16:
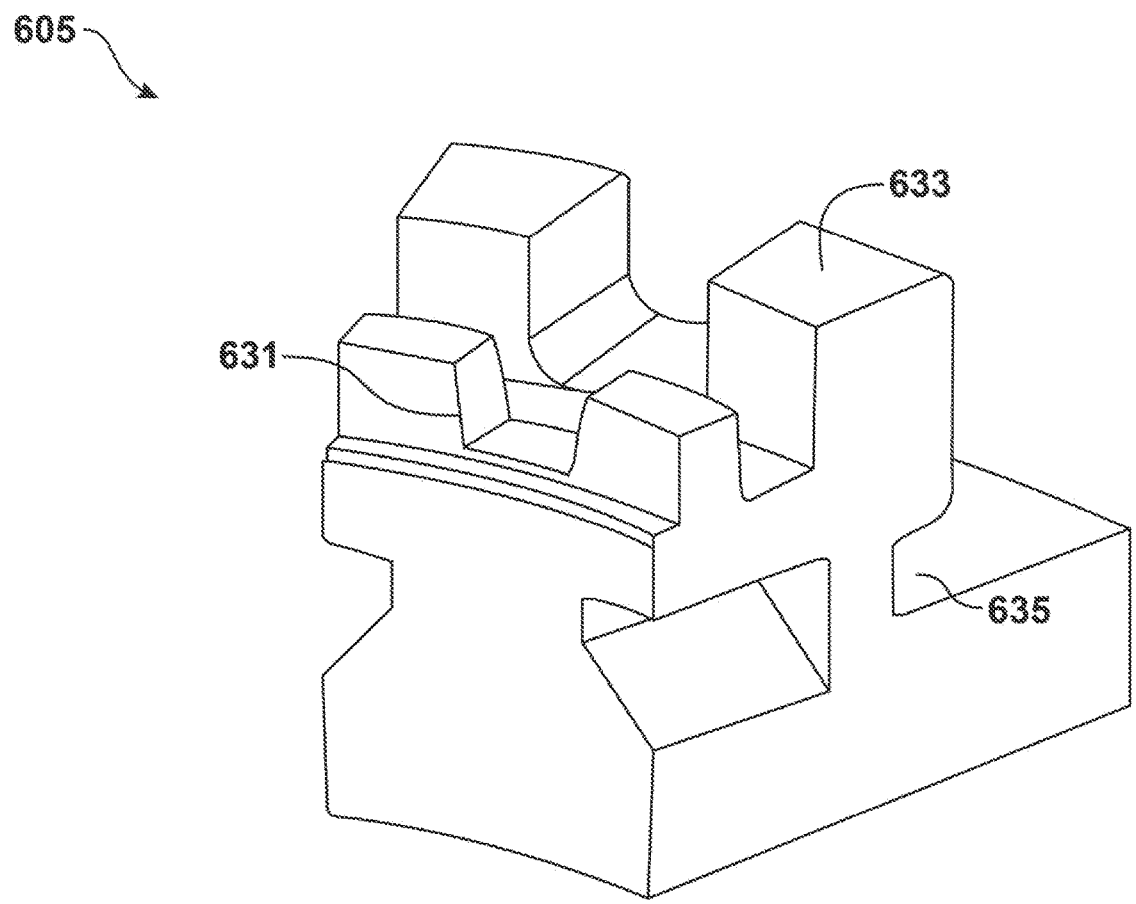
FIG. 16 is an illustration of a deformable wedge module which may be utilized in an embodiment of a variation of the Tesar-Shin precision coupling interface made in accordance with the teachings herein.

FIGS. 13-14 depict another particular, non-limiting embodiment of a quick-change interface 601 for a rotary actuator in accordance with the teachings herein. In this embodiment, a Tesar/Shin type interface is achieved through the use of deformable wedge modules 603 and rigid wedge modules 605, which are shown in greater detail in FIGS. 15 and 16, respectively. The deformable wedge modules 603 and rigid wedge modules 605 are utilized as standardized press fit plug-ins on the periphery of the first 607 and second 609 annular members forming the interface.

As seen in FIG. 13, the deformable wedge module 603 is equipped with a pair of symmetrical, deformable wedges 621 and contact flats 623. The deformable wedge module 603 is also equipped with a C-clamp groove 625, which is continuous with the C-clamp groove 611 of the first 607 annular member. Similarly, as seen in FIG. 14, the rigid wedge module 605 is equipped with wedge mating surfaces 631 and contact flats 633. The rigid wedge module 605 is also equipped with a C-clamp groove 635, which is continuous with the C-clamp groove 613 of the second 609 annular member.

The interface 601 depicted in FIG. 13 is advantageous in that it allows for mass production of the modules 603, 605, thus reducing their cost. Once pressed into their tapered radial grooves, these modules 603, 605 may be bolt fastened to prevent walking under oscillating forces. While this embodiment would not be expected to provide high rotary stiffness, a centering ring (boss) may be utilized to provide radial stiffness and a somewhat lower level of radial accuracy.

Figure 17:
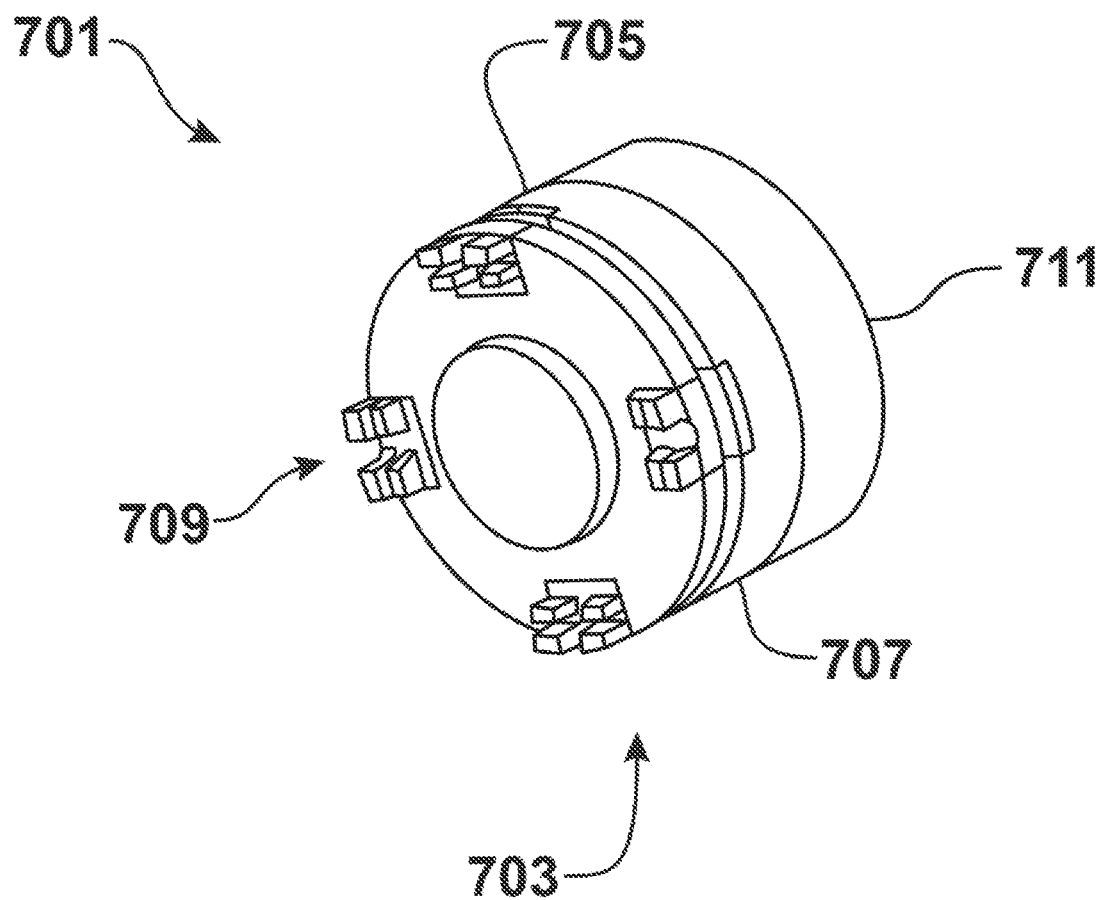
FIG. 17 is an illustration of a rotary actuator equipped with a quick change interface which is driven by a gear train.

FIG. 17 depicts a particular, non-limiting embodiment of a rotary actuator 701 equipped with a rigid wedge module interface of the type depicted in FIG. 14. As seen therein, the rotary actuator 701 includes an interface 703 having first 705 and second 707 annular members and equipped with rigid wedge modules 709. The interface 703 is rotatably driven by a gear train 711.

One skilled in the art will appreciate that various modifications may be made to the devices and methodologies described herein. For example, while standardized press fit plug-ins have been described for Tesar/Shin type actuator interfaces, one skilled in the art will appreciate that similar press fit plug-ins may be developed to simulate the features of other interfaces, such as the kinematic coupling interface or the Curvic coupling interface. Moreover, while these press fit plug-ins are preferably disposed on the periphery of the annular members forming the interface, in some embodiments, these plug-ins may be disposed elsewhere on the interface such as, for example, on the interior surface of the annular members.

One skilled in the art will also appreciate that the merits of a particular quick-change interface can change from one application to another. In particular, it would be desirable to study (analytically and experimentally) the various quick-change interfaces disclosed herein to verify their relative accuracy and stiffness in all six directions in order to best judge their merits for any given application.

The above description of the present invention is illustrative, and is not intended to be limiting. It will thus be appreciated that various additions, substitutions and modifications may be made to the above described embodiments without departing from the scope of the present invention. Accordingly, the scope of the present invention should be construed in reference to the appended claims.

What is claimed is:

1. A rotary actuator, comprising:
   a first interface surface with a plurality of apertures defined therein;
   a second interface surface which releasably mates with said first interface surface and which has a plurality of surface features thereon;
   a plurality of interface modules, wherein each interface module includes a first interface module portion which releasably engages one of said plurality of apertures on said first interface surface, and a second interface module portion which releasably engages said plurality of surface features on said second interface surface; and
   a gear train which rotates said first interface surface about an axis;
   wherein the second interface module portion of each of said interface modules has at least one contact flat and a first set of mating features which releasably mate with a second set of mating features disposed on the second interface surface.

2. The rotary actuator of claim 1, wherein said first interface surface is disposed on a first annular member.

3. The rotary actuator of claim 2, wherein each of said plurality of apertures in said first interface surface is a notch formed in a side of said first annular member.

4. The rotary actuator of claim 3, wherein said second interface surface is disposed on a second annular member.

5. The rotary actuator of claim 4, wherein said first annular member has a central depression on the first interface surface thereof, and wherein said second annular member has a central protrusion on the second interface surface thereof which is complimentary in shape to, and which mates with, the central depression on said first interface surface.

6. The rotary actuator of claim 5, wherein said first annular member has a first circumferential groove on a side thereof, and wherein said second annular member has a second circumferential groove on a side thereof, and further comprising a clamp which circumferentially engages said first and second annular members.

7. The rotary actuator of claim 6, wherein said clamp is equipped with a first circumferential ridge which engages said first circumferential groove, and a second circumferential ridge which engages said second circumferential groove.

8. The rotary actuator of claim 2, wherein each of said plurality of apertures is a notch formed in an interior surface of said first annular member.

9. The rotary actuator of claim 8, wherein each of said interface modules has first and second interface module portions which are separated from each other by a groove.

10. The rotary actuator of claim 9, wherein the first interface module portion of each of said interface modules has a first arcuate surface.

11. The rotary actuator of claim 9, wherein the first interface module portion of each of said interface modules has first and second opposing arcuate surfaces.

12. The rotary actuator of claim 11, wherein said first set of mating features comprise a plurality of deformable wedges.

13. The rotary actuator of claim 12, wherein said second set of mating features comprise a plurality of spaced apart, rectangular protrusions.

14. The rotary actuator of claim 2, wherein each of said interface modules has at least one hole therein, and further comprising a threaded fastener which extends through said hole and into said first annular member.

* * * * *